United States Patent

Siol et al.

Patent Number: 5,109,072
Date of Patent: Apr. 28, 1992

[54] COMPATIBLE POLYMER MIXTURES

[75] Inventors: Werner Siol, Darmstadt-Eberstadt; Ulrich Terbrack, Reinheim, both of Fed. Rep. of Germany

[73] Assignee: Rohm GmbH Chemische Fabrik, Darmstadt, Fed. Rep. of Germany

[21] Appl. No.: 406,288

[22] Filed: Sep. 12, 1989

[30] Foreign Application Priority Data

Sep. 16, 1988 [DE] Fed. Rep. of Germany ....... 3831499

[51] Int. Cl.$^5$ ..................... C08L 33/08; C08L 33/10; C08L 25/14
[52] U.S. Cl. ................... 525/228; 525/226; 525/84
[58] Field of Search ............... 525/226, 228, 84, 85

[56] References Cited

U.S. PATENT DOCUMENTS 3,475,516  10/1969  Bauer .................. 525/228

FOREIGN PATENT DOCUMENTS 192502  4/1970  Fed. Rep. of Germany .
033574  3/1979  Japan .
164749  7/1987  Japan .................. 525/228

Primary Examiner—John C. Bleutge
Assistant Examiner—David Buttner
Attorney, Agent, or Firm—Oblon, Spivak, McClelland, Maier & Neustadt

[57] ABSTRACT

A compatible polymer mixture of two polymers, consisting essentially of:

A) 1-99 wt. % of a copolymer having formula I, and

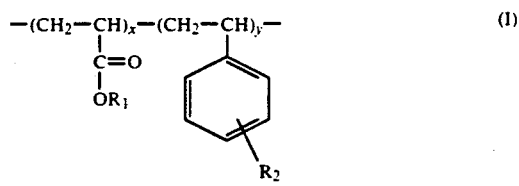

B) 99-1 wt. % of a polyalkyl methacrylate prepared from at least one monmer having formula II

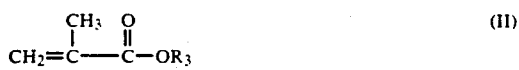

wherein $R_1$ is $C_{1-4}$ aliphatic hydrocarbon group, $R_2$ is hydrogen or methyl, $R_3$ is a $C_{2-8}$ non-cyclic aliphatic hydrocarbon group, x is 10-90 wt. % based on the amount of copolymer I and y is 90-10 wt. % based on the amount of copolymer I.

23 Claims, 1 Drawing Sheet

COMPATIBLE POLYMER MIXTURES

BACKGROUND OF THE INVENTION

1. Field of the Invention

The invention relates to compatible polymer mixtures comprised of polymethacrylate esters and styrene-acrylate copolymers.

2. Discussion of the Background

When polymers are mixed there is an overwhelming likelihood that they will be incompatible (see Kirk-Othmer, "Encyclopedia of Chemical Technology", 1982, Vol. 18, 3rd Ed., pub. John Wiley, pp. 443-478). Polystyrene and polyalkyl methacrylates are good examples of incompatible polymers. Thus, M. T. Shaw et al. (see Chem. Abstr. 101:73417e) reported a miscibility of only 3.4 ppm polymethyl methacrylate (PMMA, m.w. 1600,000) with polystyrene. Even very low molecular weight polystyrene is relatively incompatible with PMMA (Parent, R. R., et al., J. Polym. Sci., Polym. Phys. Ed., 16:1829, 1987). Other polyalkyl methacrylates are also incompatible with polystyrene. Apparently the only exceptions are mixtures of polystyrene and polycyclohexyl acrylate and polycyclohexyl methacrylate (see Ger. OS No. 36 32 369). Thus, styrene homopolymer is incompatible with nearly all polyalkyl methacrylates, but this incompatibility does not apply in the case of copolymers of styrene and acrylonitrile. Thus, compatibility has been found between certain styrene/acrylonitrile copolymers and PMMA (see Barlow, J. W. et al., Polymer, 28:1177, 1987). However, because this compatibility has apparently been found only for very narrowly specified copolymer compositions of the styrene/acrylonitrile component, the compatibility situation is described as having "miscibility windows". In such cases, the miscibility of the specific styrene/acrylonitrile copolymers with PMMA can be attributed to substantial repulsive forces between the styrene unit and the acrylonitrile unit in the copolymer.

A similar condition is believed to prevail in the case of styrene/maleic anhydride copolymers, which are compatible with PMMA at certain ratios of styrene t maleic anhydride. This group of PMMA-compatible styrene copolymers probably includes copolymers of styrene and allyl alcohol and copolymers of styrene and p-(2-hydroxyhexafluoroisopropyl)styrene, the PMMA compatibility of which has been interpreted as being due to hydrogen bonding of the hydroxyl group with the PMMA ester group (Min, B. Y., and Pearce, Eli M., Org. Coatings and Plast. Chem., 45:45:58-64, 1981; Cangelori, F., and Shaw, M. T., 1983 Polymer Reprints (Am. Chem. Soc., Div. Polym. Chem.), 24:258-259, 1983).

Although compatibility of PMMA with copolymers of styrene and strongly polar monomers such as acrylonitrile, maleic anhydride, allyl alcohol, and p-(2-hydroxyhexafluoroisopropyl)styrene has been known for a number of years, these compatible polymer mixtures have been and continue to be regarded as special exceptions in the large range of incompatible polystyrene/polyalkyl methacrylate mixtures. This view is particularly understandable in that as a rule the compatibility of these styrene copolymers has been limited to PMMA as a mixture partner.

Also, for a long time polyalkyl methacrylates and polyalkyl acrylates have been regarded as mutually incompatible. However, as demonstrated in unpublished Ger. Pat. App. P No. 37 08 427.5 of Mar. 16, 1987, under certain conditions polyalkyl methacrylates and polyalkyl acrylates are compatible. The prerequisites for good compatibility, according to P No. 37 08 427.5 are:

a) Comparability of the Van der Waals volumes of the alkyl groups of the polymethacrylate and the polyacrylate; and b) Alkyl groups which are large (5-40 carbon atoms) and are sterically hindering and spatially fixed.

Examples which might be mentioned of mixtures which are compatible in any ratio, even at room temperature, are polycyclohexyl acrylate/polycyclohexyl methacrylate, and poly-3,3,5-trimethylcyclohexyl acrylate/poly-3,3,5-trimethylcyclohexyl methacrylate.

As long as the number of carbon atoms in the alkyl groups of the polyacrylate and polymethacrylate coincide, compatibility has been found at higher temperatures even for short-chain alkyl groups. Thus, for the system polyethyl acrylate/polyethyl methacrylate, complete miscibility has been found for temperatures above 190° C.; also for the system polybutyl acrylate/polybutyl methacrylate (see FIGS. 3 and 4 of Ger. Pat. App. P No. 37 08 427.5). Such mixtures of polyalkyl acrylate and polyalkyl methacrylate thus display an upper critical solution temperature (UCST).

In certain instances and in certain areas of the plastics industry, mechanical mixtures of polymers have led to products with improved properties, and in some cases the range of possible applications of the subject materials has been substantially broadened (see Kirk-Othmer, loc. cit., Vol. 18). The physical properties of such "polyblends" ordinarily represent a compromise; in favorable cases, such compromises can furnish a net improvement in comparison with the properties of the individual polymers. On the other hand, the technical applicability of incompatible (multiphase) polymer mixtures is often evaluated as better than that of compatible mixtures (see Kirk-Othmer, loc. cit., P. 449).

Compatible polymer mixtures with favorable mechanical properties can be regarded as technically useful based particularly on the fact that they are expected to have good optical properties. On the other hand, based on the known state of the art, there is little prospect of obtaining technically useful polymer mixtures from components having as their respective components styrene (co)polymers, and polyalkyl(meth)acrylates, particularly if it is required that the polymer mixtures be compatible at room temperature at all mixture ratios.

SUMMARY OF THE INVENTION

Accordingly, one object of the present invention is to provide compatible polymer mixtures of styrene (co)polymers and polyalkyl(meth)acrylates.

This and other objects which will become apparent from the following specification have been achieved by the present compatible polymer mixtures.

BRIEF DESCRIPTION OF THE DRAWING

A more complete appreciation of the invention and many of the attendant advantages thereof will be readily obtained as the same becomes better understood by reference of the following detailed description when considered in connection with the accompanying drawing, wherein.

DETAILED DESCRIPTION OF THE PREFERRED EMBODIMENTS

Figure 1:
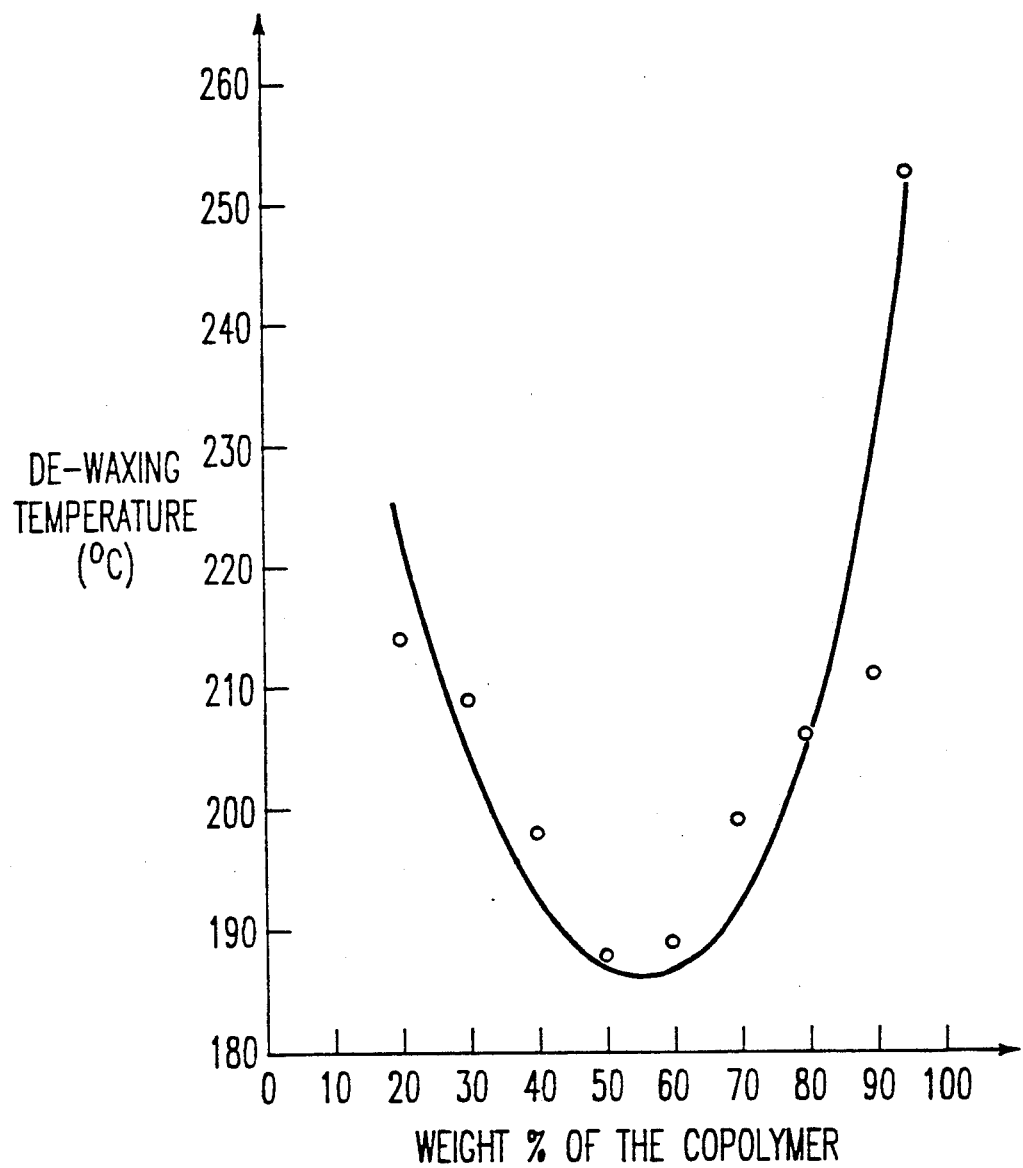
FIG. 1 shows the phase diagram for a mixture of polyethylmethacrylate and a copolymer containing 60 wt. % butylacrylate and 40 wt. % styrene monomer units.

It has been discovered, that, surprisingly, styrene-acrylate copolymers form highly compatible polymer mixtures with polyalkyl methacrylates, if certain clearly defined limiting conditions are observed.

The present invention relates to compatible polymer mixtures comprised of two different polymer components:

A) A polymer of formula (I)

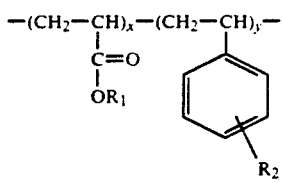

present in the amount of 1-99 wt. %, preferably 5-95 wt. %, particularly preferably 25-75 wt. %, and comprising a copolymer comprised of the following monomer units:

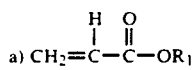

and

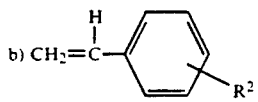

and

B) A polyalkyl methacrylate, present in the amount of 99-1 wt. %, preferably 95-5 wt. %, particularly preferably 75-25 wt. %, and comprised of units of one or more monomers of formula II:

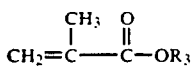

where $R_1$ represents an aliphatic hydrocarbon group with 1-4 carbon atoms; $R_2$ represents hydrogen (preferably) or methyl; $R_3$ represents a non-cyclic aliphatic hydrocarbon group with 2-8 carbon atoms; x represents 10-90 wt. %, preferably 20-80 wt. %, and particularly preferably 60-40 wt. %, based on the amount of polymer of formula I; and y represents 90-10 wt. %, preferably 80-20 wt. %, and particularly preferably 40-60 wt. %, based on the amount of polymer of formula I.

For certain applications, particularly if it is essential to have compatibility at low temperatures but not at high temperatures (polymer mixtures with LCST behavior), x of <60 wt. % is advantageous (with y >40 wt. %). The method of characterization of the present polymer mixtures as compatible mixtures employs the recognized criteria (see Kirk-Othmer, loc. cit., Vol. 18, pp. 457-460; and Brandrup-Immergut, "Polymer Handbook", 2nd Ed., pub. John Wiley, p. 111-211, 1975):

a) Using optical methods, a single index of refraction is found for each polymer mixture, having a value between the indices of refraction of the two individual polymer components (A) and (B); and b) A single glass transition temperature Tg is found for each polymer mixture, having a value between the glass transition temperatures of the two polymer components.

Another test for the miscibility of polymers is the occurrence of a lower critical solution temperature (LCST). The existence of a LCST is indicated when a heretofore clear mixture separates into phases as it is heated, and becomes optically cloudy. This behavior is clear proof that the original polymer mixture was comprised of a single homogeneous phase in equilibrium (see Ger. OS No. 36 36 476, and U.S. Pat. No. 4,722,595). Further, polymer mixtures may display the UCST phenomenon. Opposite of the situation with an LCST, such polymer mixtures show compatibility (single-phase composition) at high temperature, but incompatibility (phase separation) at lower temperature (see Olabisi, O., Robeson, L. M., and Shaw, M. T., "Polymer-Polymer miscibility", pub. Academic Press, 1979; Kirk-Othmer, loc. cit., pp. 457-460; and unpublished Ger. Pat. App. P No. 37 08 438.3).

Preferably, the polymer mixture has a LCST. Preferred are polymer mixtures compatible at room temperature. Particularly preferred are such mixtures which are compatible in the range 0°-260° C., i.e. which show no de-mixing in this range. The invention contemplates styrene-acrylate copolymer/polyalkyl methacrylate mixtures for specific ratios of styrene to acrylic acid ester, which mixtures display such excellent compatibility that they are fully compatible at any temperature and any mixture ratio, e.g. under such range of temperatures and mixture ratios they have a single index of refraction and a single glass transition temperature. Preferably the sum of polymer components (A) and (B) comprises 100% of all the polymers in the polymer mixture. However, under some conditions the polymer mixture may be used, e.g. in processing, in combination with other polymers.

Polymer Component (A)

Polymer component (A) is a mixed polymer the structure of which is given schematically by formula I above. The method of producing such mixed polymers or block copolymers is per se known (see "Producing the Polymers", below). Preferred are copolymers comprised of monomer units of n-butyl acrylate, n-propyl acrylate, ethyl acrylate, or methyl acrylate, as the monomer units (a), and styrene, as the monomer units (b), with the monomer units being present in the ratios characterized by x and y. p-Methylstyrene and m-methylstyrene are less preferred. o-Methylstyrene is much less desirable.

Particularly worthy of mention is butyl acrylate-styrene copolymer in the ratio of butyl acrylate to styrene in the range 40:80 to 80:20. Also ethyl acrylate-styrene copolymers with the ratio of ethyl acrylate to styrene in the range 70:30 to about 20:80, and methyl acrylate-styrene copolymer with the ratio of methyl acrylate to styrene in the range 50:50 to about 20:80. These ratios represent the weight percents of the respective monomer units in the copolymers. As a general rule, for good compatibility at room temperature there must be a certain minimum styrene proportion, preferably >40 wt. %. This is particularly the case for methacrylate-styrene copolymers or ethyl acrylate-styrene copolymers, with the preferred styrene proportion in these instances being >45 wt. %.

In a preferred embodiment, the polymer component (A) is comprised of a polymer of formula I which is comprised exclusively of units of styrene and acrylates. However, the polymer of formula I may be modified with small proportions of other monomers (copolymerizable with styrene and acrylates), e.g. in the amount of 0.5 to <10 wt. %. These may be, e.g., acrylic acid, methacrylic acid, acrylamides, and/or methacrylamides, in the amount of <5 wt. %, preferably <2.5 wt. %, particularly preferably <1 wt. %. Examples of possible (methy)acrylamides are acrylamide and hydroxymethyl methacrylamide. Other candidates, present in the amount of <10 wt. %, preferably <6 wt. %, particularly preferably <4 wt. %, are aminoalkyl (meth)acrylates, aminoalkyl methacrylamides, hydroxyalkyl (meth)acrylates, and/or hydroxyalkyl (meth)acrylamides. Examples are hydroxyethyl acrylate and N,N-dimethylaminoethyl acrylate. As a rule, these comonomer units, employed in small proportions, serve to promote adhesion of the polymer or polymer mixture to a substrate, for pigment stabilization, etc.

While polymer component (A) may contain additional comonomers such as (meth)acrylic acid, (meth)acrylamides, aminoalkyl (meth)acrylates, and/or hydroxyalkyl (meth)acrylates for purposes of functionalization, the following comonomers should be present in polymer component (A) at most in the amount of <3 wt. %, preferably <1 wt. %, and particularly preferably 0 wt. % (i.e., not at all): acrylonitrile, maleic anhydride, allyl alcohol, and hydroxyhexafluoroisopropyl styrene.

Polymer Component (B)

Polymer component (B) is a polymer, preferably a homopolymer, comprised of methacrylic acid esters of formula II. $R_3$ preferably represents n-butyl, isobutyl, propyl, ethyl, hexyl, or amyl. Thus, shortchain alkyl groups are favored for $R_3$, as for $R_1$. Voluminous, sterically fixed cyclic hydrocarbons do not satisfy the requirements of the present invention. According to the invention, $R_1$ includes alkyl groups with 1-4 carbon atoms, and $R_3$ includes alkyl groups with 2-8 carbon atoms. $R_3$ may be linear or branched, but not cyclic; cyclic alkyl groups are not within the scope of the invention.

Particularly preferred is the case where $R_1$ in the acrylate (a) of component (A) and $R_3$ in the methacrylate of component (B) are identical. If $R_3$ is not identical to $R_1$, it is preferred that the difference between the number of carbon atoms in group $R_3$ and that in group $R_1$ be not more than 3; and it is particularly preferred that this difference not exceed 2.

Preferably, units of the methacrylate ester of formula II comprise more than 80 wt. % of polymer component (B), particularly preferably more than 90 wt. %. Candidates for the comonomers present in the amount of <20 wt. %, preferably <10 wt. %, are vinyl compounds copolymerizable with the monomers of formula II; e.g., methacrylate esters appreciably different ions of the following (generally from 1 wt. % to <5 wt. %): acrylic acid, methacrylic acid, (meth)acrylamides, and/or (meth)acrylic acid hydroxyalkyl esters, (meth)acrylic acid hydroxyalkyl amides, (meth)acrylic acid aminoalkyl esters, and/or (meth)acrylic acid aminoalkyl amides. The following polymer mixtures are of particular interest:

"PM1": (A) n-Butyl acrylate-styrene copolymer, and (B) Poly-n-butyl methacrylate.
"PM2": (A) n-Butyl acrylate-styrene copolymer, and (B) polyisobutyl methacrylate.
"PM3": (A) n-Butyl acrylate-styrene copolymer, and (B) Poly-n-propyl methacrylate.
"PM4": (A) n-Butyl acrylate-styrene copolymer, and (B) Poly-n-hexyl methacrylate.
"PM5": (A) Ethyl acrylate-styrene copolymer, and (B) polyethyl methacrylate.
"PM6": (A) Methyl acrylate-styrene copolymer, and (B) Polyethyl methacrylate.

For all these polymer mixtures there are styrene copolymer compositions (see examples, below) for which these polymer mixtures are fully compatible, independent of formulation ratio and at all practicable temperatures (i.e., room temperature to 260° C.).

Also of interest are polymer mixtures comprised of butyl acrylate-styrene copolymer and poly-n-butyl methacrylate. Other polymer mixtures having a LCST are also of potential value, e.g. the system (shown in FIG. 1.

(A) Butyl acrylate-styrene copolymer, with styrene units in the amount of 40 wt. %., and
(B) Polyethyl methacrylate.

Production of Polymers (A) and (B)

Polymers (A) and (B) can be produced according to the known rules of polymerization and by known methods. The polymers of type (A) can be produced, e.g., according to Houben-Weyl, "Methoden der Organischen Chemie", 4th Ed., Vol. XIV/1, pub. Georg Thieme-Verlag, pp. 761–841, 1961. The radical polymerization method is preferred, but ionic polymerization may be used. The molecular weight M of polymer (A) is as a rule above 3,000, preferably 5,000–1,000,000, particularly preferably 20,000–500,000, as determined by light scattering. The homo- or copolymers of polymer (B) can be manufactured by known methods, e.g. Rauch-Puntigam, H., and Voelker, Th., "Acryl- und Methacrylverbindungen", pub. Springer Verlag, 1967. While, in principle, manufacture by anionic polymerization or group transfer polymerization is possible (see Webster, O. W., et al., J. Am. Chem. Soc., 105:5706, 1983), radical polymerization is preferred. The polymerization may be carried out in bulk, in suspension, in emulsion, or in solution. For radical polymerization, the usual radical initiators are preferably used, e.g. peroxide type initiators (particularly organic peroxide compounds such as dibenzoyl peroxide or dilauroyl peroxide) or azo type (such as azobisisobutyronitrile), or optionally redox initiators, in customary amounts of about 0.01–2 wt. %.

The starting radicals may also be generated by energetic radiation. Regulators employed may comprise the usual sulfur regulators, particularly mercapto compounds.

Available observations indicate that the molecular weights of the polymers do not impose substantial limitations on the compatibility. It would have been expected that the known rule would apply, that compatibility with other polymers tends to decrease with increasing molecular weight.

As a rule the molecular weight of polymer (B) is greater than 3,000, generally 10,000 to 1,000,000, preferably 20,000 to 300,000 (as determined by light scattering). In selecting the monomers to be employed as comonomers in polymer (B), one should take into account that the glass transition temperature Tg limits the applicability of the polymer mixture system, but does not limit it in a major way. Thus, to produce molded parts from the polymer mixture, at least one of the polymers P1 and P2 should have a Tg >70° C., and preferably the polymer mixture should have Tg >70° C. as well. (For determination of Tg, see Paul, D. R., and Newman, S. "Polymer Blends", Vol. 1, Chap. 5, pub. Academic Press, 1978). Tg can be estimated based on the monomers (see Vieweg-Esser, "Kunststoff Handbuch", Vol. IX, pub. Carl Hanser-Verlag, pp. 333-340, 1975). This limitation applies particularly to manufacture of injection-molded, pressed, or extruded objects. For other areas of application, e.g. paints, elastomers, or reversible thermotropic vitrification (a polymer mixture with a cloud point upon heating), thus for use according to Ger. OS No. 34 36 477, preferred polymer mixtures are those which have a polymer B with a glass transition temperature Tg <40° C., or preferably <20° C.

Preparation of the Polymer Mixtures (PM)

Various methods may be employed to prepare the compatible mixtures; e.g.: intensive mechanical intermixing of the components (A) and (B) in the melt, in an extruder or the like; preparation as "solution cast polyblends" from a common solvent (see Kirk-Othmer, loc. cit., Vol. 18, pp. 442-478); dissolution of polymer (A) in the mixture of monomers for polymer (B), followed by production in the presence of polymer (A); or vice versa; or preparation of the polymer mixture PM from a common precipitating mixture. There are no constraints on the method of mixing. As a rule, mixtures of the components (A) and (B) are produced first. Preferably the starting materials are solids in the form of, e.g., the polymers in bead or granulate form, and the mixing apparatus is of the slow moving type, e.g. a drum mixer, an open-wheel mixer, or a double chamber plow-type mixer. Slow moving equipment achieves mechanical intermixing without strictly eliminating phase boundaries (see "Ullmanns Encyklopaedie der technischen Chemie", 4th Ed., Vol. 2, pub. Verlag Chemie, pp. 282-311). Then thermoplastic preparation is carried out with homogeneous mixing in the melt, using heatable apparatus at suitable temperatures, e.g. 150-300° C. (apparatus such as kneader-mixers or, preferably, extruders, e.g., single-screw or multiple-screw extruders, or extruders with oscillating screws and shear rods, such as a Bussco ® kneader-mixer). The particle size of the granulate used is generally in the range 2-5 mm.

Another, quite simple method of producing the polymer mixtures is intermixing of polymer dispersions containing the respective polymers, (A) and (B). These mixtures of dispersions may be commonly coagulated, commonly spray dried, commonly extruded in an extruder, or commonly dried to form a film.

Advantageous Effects of the Polymer Mixtures (PM)

A principal advantage of the polymer mixtures is that, in contrast to mixtures comprised of other poly(meth)acrylates and polystyrenes, they are compatible. That is, in contrast to incompatible mixtures of polystyrenes and poly(meth)acrylates, in the unpigmented state the inventive polymer mixtures are transparent, they do not scatter light, i.e. the haze is <10%. According to the invention, however, they may display a LCST or UCST. Of particular interest are polymer mixtures having compatibility at room temperature. Also of interest are polymer compositions comprised of the described polymer mixture PM in the amount of 40-99 wt. %, preferably 70-95 wt. %, and a third polymer P which is chemically differentiable from (A) and (B), in the amount of 60-1 wt. %, preferably 30-5 wt. %, where polymer P is incompatible with polymer (A), polymer (B), and the mixture PM.

As a rule, the composition of the polymer mixture PM is chosen such that the index of refraction of the polymer P coincides with that of the mixture PM. Thus, at room temperature as a rule the following inequality should hold:

$$|n_D{}^{25}{}_{PM} - n_D{}^{25}{}_P| < 0.01,$$

where $n_D{}^{25}{}_{PM}$ is the refractive index of the compatible polymer mixture and $n_D{}^{25}{}_P$ is the refractive index of the third polymer.

As a rule, the polymer P incompatible with the polymer mixture PM will have Tg <20° C. and will be covalently bonded with at least one of the components of the polymer mixture PM, i.e. with (A) or (B). Polymer P may also be crosslinked. Particularly preferred is the case where the polymer P is polybutadiene or polyisoprene.

Polymer compositions comprised of PM in the amount of 40-99 wt. % and P in the amount of 1-60 wt. % are distinguished by improved impact strength over that of pure PM, particularly if P has Tg <20° C.

It is possible to produce an optical gradient fiber with a sheath of polymer (B) around a core part of polymer (A).

The compatible polymer mixtures comprising styrene-acrylate ester copolymers and polyalkyl methacrylates are particularly suited for use in the paint and varnish industrial sector. This is principally due to the fact that these mixtures are always compatible and transparent at room temperature, and sometimes even at 0° C. or −20° C.

The polymer components (A) and (B) in a coating composition may be applied, e.g., together, from a solution. Also polymer dispersions can be dried together to form a film.

By varying the mixture ratio of polymer component (A) to polymer component (B), a number of physical properties of the polymer mixture may be varied, e.g. the index of refraction, hardness, and glass transition temperature.

Of particular interest also are paints or varnishes wherein polymer component (B), which may contain a uv-absorbing agent (even polymerized into it), comprises the outer coat of an object which contains polymer (A) in a coat underlying said outer coat, or which is comprised entirely of polymer (A). Particularly in the case of multicoat coatings with polymer component (B) as the finish coat, a compatible mixture can form in the zone between the finish coat B and the coat A below coat B, which mixture is comprised of polymer component (A) and polymer component (B).

Other features of the invention will become apparent in the course of the following descriptions of exemplary embodiments which are given for illustration of the invention and are not intended to be limiting thereof.

EXAMPLES

For these examples, the VICAT softening temperature is determined according to DIN 53 460. The viscosity index J (ml/g) is determined based on DIN 51

562 (Parts 2 and 3) and DIN 7745 (Part 2). The light permeability, unless stated otherwise, is determined according to DIN 5036. The haze (%) is determined according to ASTM D 1003.

EXAMPLE 1

Production of Copolymer (A1)

A mixture of methyl acrylate (74.35 g), styrene (25 g), t-dodecyl mercaptan (0.5 g), and azobisisobutyronitrile (0.15 g) was polymerized 16 hr at 50° C. with exclusion of air, in a bag comprised of Hostaphan ® (supplied by the firm Hoechst). Then the polymer was precipitated out in methanol, and was dried. Because the conversion was not 100%, the composition of the polymer (A1) was determined analytically.

The resulting copolymer had the following composition and viscosity index:

| Methyl acrylate | 53 wt. % |
|---|---|
| Styrene | 47 wt. %. |
| J = 47 ml/g. | |

EXAMPLE 2

Production of Copolymer (A2)

The same polymerization method as in Example 1 was used, but with the following composition of the reaction mixture: methyl acrylate (50.0 g), styrene (50.0 g), t-dodecyl mercaptan (0.5 g), azobisisobutyronitrile (0.15 g). The polymer was precipitated out and analyzed as before.

The resulting copolymer had the following composition and viscosity index:

| Methyl acrylate | 36 wt. % |
|---|---|
| Styrene | 64 wt. % |
| J = 37 ml/g. | |

EXAMPLE 3

Production of Copolymer (A3)

The same procedure, including the workup procedure, was used as in Examples 1 and 2, but with the following composition of the reaction mixture: methyl acrylate (25.0 g), styrene (75.0 g), t-dodecyl mercaptan (0.5 g), azobisisobutyronitrile (0.15 g).

The resulting copolymer had the following composition (by analysis) and viscosity index:

| Methyl acrylate | 23 wt. % |
|---|---|
| Styrene | 77 wt. % |
| J = 27 ml/g. | |

EXAMPLES 4 to 6

The same procedure was used as in Examples 1-3, but the monomers were ethyl acrylate and styrene; and t-dodecyl mercaptan (0.5 g) and azoisobutyronitrile (0.15 g) were again used in the polymerization.

EXAMPLE 4

Composition of reaction mixture (in addition to the mercaptan and the azo compound): ethyl acrylate (75.0 g), styrene (25.0 g).

The resulting copolymer (A4) had the following composition (by analysis) and viscosity index:

| Ethyl acrylate | 55 wt. % |
|---|---|
| Styrene | 45 wt. % |
| J = 47 ml/g. | |

EXAMPLE 5

Composition of reaction mixture (in addition to the mercaptan and the azo compound): ethyl acrylate (50.0 g), styrene (50.0 g).

The resulting copolymer (A5) had the following composition (by analysis) and viscosity index:

| Ethyl acrylate | 38 wt. % |
|---|---|
| Styrene | 62 wt. % |
| J = 32 ml/g. | |

EXAMPLE 6

Composition of reaction mixture (in addition to the mercaptan and the azo compound): ethyl acrylate (25.0 g), styrene (75.0 g).

The resulting copolymer (A6) had the following composition (by analysis) and viscosity index:

| Ethyl acrylate | 22 wt. % |
|---|---|
| Styrene | 78 wt. % |
| J = 28 ml/g. | |

EXAMPLES 7 AND 8

A monomer mixture of butyl acrylate and styrene, along with dodecyl mercaptan, 0.2 wt. %, as a regulator, and t-butyl peroctanoate, 0.12 wt. %, as initiator (wt. % figures on the basis of the amount of the monomers in the mixture), was fed to a continuously operated pressure reactor, at about 150° C., until the conversion in the polymerization reached about 50%. The reaction mixture was then degassed. The results are shown below as the composition of the products in terms of the monomer units.

EXAMPLE 7

Composition of copolymer (A7) (by analysis), and viscosity index:

| Butyl acrylate | 60 wt. % |
|---|---|
| Styrene | 40 wt. % |
| J = 60 ml/g. | |

EXAMPLE 8

Composition of copolymer (A8) (by analysis), and viscosity index:

| Butyl acrylate | 75 wt. % |
|---|---|
| Styrene | 25 wt. % |
| J = 54 ml/g. | |

EXAMPLE 9

Production of polymer (B1) by suspension polymerization

Ethyl methacrylate (1,000 g) was polymerized, with addition of lauroyl peroxide (5 g) and 2-ethylhexyl thioglycollate (4 g), in aqueous suspension using aluminum hydroxide as a suspension agent, at 70° C., under nitrogen as an inert gas. After completion of the polymerization the reaction mixture was cooled to 30° C., and the aluminum hydroxide was dissolved with dilute sulfuric acid. Then the beads were washed and dried.

The resulting beads of polymer (B1) had a viscosity index J=48 ml/g.

EXAMPLE 9a

Production of polymer (B1a) with lower molecular weight

Ethyl methacrylate (979.5) to which mercaptoethanol (20 g) and azobisisobutyronitrile (0.5 g) had been added was polymerized 4 days at 50° C. in a plastic bag (Hostaphan ®), with exclusion of air. The product was then dissolved in acetone, precipitated in cold petroleum ether, and dried in vacuum at 70° C.

The resulting polymer (B1a) had a viscosity index J=11 ml/g.

EXAMPLE 10

Polymer (B2)

The procedure was as in Example 9, but the monomer used was n-butyl methacrylate.

The resulting polymer beads had a viscosity index J=28 ml/g.

EXAMPLE 11

Polymer (B3)

The procedure was as in Example 9, but the monomer used was isobutyl methacrylate.

The resulting polymer beads had a viscosity index J=36 ml/g.

EXAMPLE 12

Polymer (B4):

The procedure was as in Example 9, but the monomer used was n-propyl methacrylate.

The resulting polymer beads had a viscosity index J=42 ml/g.

EXAMPLE 13

Production of polymer (B5) by bulk polymerization:

Neopentyl methacrylate (100 g), to which azobisisobutyronitrile (0.16 g) and dodecyl mercaptan (0.32 g) had been added, was polymerized in a glass vessel 4 hr at 60° C., under inert gas. The product was then precipitated out in methanol, and dried in vacuum at 70° C. J=8 ml/g.

EXAMPLE 14

Production of poly-n-hexyl methacrylate (B6) by bulk Polymerization

Hexyl methacrylate (489.75 g), to which mercaptoethanol (10 g) and azobisisobutyronitrile (0.25 g) had been added, was polymerized in a plastic bag (Hostaphan ®) for 5 days at 50° C., with exclusion of air. The product was then dissolved in acetone, precipitated out in methanol, and dried at 70° C. in vacuum. J=8 ml/g.

EXAMPLE 15

Production of polybenzyl methacrylate as a comparison product

The procedure was as in Example 13, but the monomer used was benzyl methacrylate J=18 ml/g.

EXAMPLE 16

Production of polyisobornyl methacrylate as a comparison product

The procedure was as in Example 13, but the monomer used was isobornyl methacrylate. J=2 ml/g.

EXAMPLE 17

Production of poly-3,3,5-trimethylcyclohexyl methacrylate as a comparison product The procedure was as in Example 13, but the monomer used was 3,3,5-trimethylcyclohexyl methacrylate. J=6 ml/g.

EXAMPLE 18

Polymethyl methacrylate comparison product

As a polymethyl methacrylate comparison product, a continuously produced copolymer of methyl methacrylate (96 wt. %) and methyl acrylate (4 wt. %) was used. The molecular weight of this polymer was characterized by J =52 ml/g. Plexiglas ® Y7N (supplied by the firm Rohm GmbH) can be used as such a polymer Mixture Tests for evaluating the compatibility of the styrene-acrylate copolymers (polymer A) with the polyalkyl methacrylates (polymer B)

The styrene-acrylate copolymer (polymer A) was dissolved in toluene to form a 20 wt. % solution. The polyalkyl methacrylate (polymer B) was also dissolved in toluene to form a separate 20 wt. % solids solution. These solutions were mixed in ratios 5:95, 25:75, 50:50, 75:25, and 95:9 by weight. Films were film-cast from the mixtures, with drying under a vacuum. The results were clear, compatible polymer films, some of which became cloudy upon heating (indicating a LCST). In a few cases, the films as formed were cloudy, and became clear upon heating. Particularly interesting were the polymer films which were clear at all temperatures. Also interesting were the polymer films which were compatible at room temperature and de-mixed upon heating (displaying a LCST). Polymer compatibilities are shown in Tables 1–3 and FIG. 1.

TABLE 1

Evaluation of the compatibility of various styrene-ethyl acrylate copolymers (polymer A) with various polymethacrylates.

| Polymethacrylate | Proportion of styrene (wt. %) in copolymer (A): | | |
|---|---|---|---|
| | 45 | 62 | 78 |
| Polymethyl methacrylate (J = 52 ml/g) | − | − | − |
| Polyethyl methacrylate (J = 48 ml/g) | ++ | ++ | LCST |
| Poly-n-butyl methacrylate (J = 38 ml/g) | − | − | . |
| Polyisobutyl methacrylate | − | − | − |

TABLE 1-continued

Evaluation of the compatibility of various
styrene-ethyl acrylate copolymers (polymer A) with
various polymethacrylates.

| Polymethacrylate | Proportion of styrene (wt. %) in copolymer (A): | | |
|---|---|---|---|
| | 45 | 62 | 78 |
| (J = 36 ml/g) | | | |

"—" = incompatible in all mixture ratios.
"++" = Compatible in all mixture ratios, over the entire temperature range studied (20-260° C.).
"LCST" = Compatible in all mixture ratios at room temperature, but displays de-mixing at elevated temperatures.

TABLE 2

Evaluation of the compatibility of various
styrene-methylacrylate copolymers (A) with various
polymethacrylates (B).

| Polymer component (B) | Proportion of styrene (wt. %) in copolymer (A): | | |
|---|---|---|---|
| | 47 | 64 | 77 |
| Polyethyl methacrylate (J = 48 ml/g) | — | ++ | LCST (250° C.) |
| Poly-n-butyl methacrylate (J = 38 ml/g) | — | — | — |
| Polyisobutyl methacrylate (J = 36 ml/g) | — | — | |

"—" = incompatible in all mixture ratios
"++" = Compatible in all mixture ratios, over the entire temperature range studied (20-260° C.).
"LCTS (250° C.)" = Compatible in all mixture ratios at room temperature, but when a 1:1 sample (ratio of polymer (A):polymer (B)) was heated, de-mixing occurred at 250° C.

TABLE 3

Evaluation of the compatibility of various
styrene-butyl acrylate copolymers (polymer A) with
various polymethacrylates.

| Polymethacrylate | J (ml/g) | Proportion of styrene (wt. %) in copolymer (A): | |
|---|---|---|---|
| | | 40[1] | 25[2] |
| Polyethyl methacrylate | 11 | +(LCST) | ++ |
| Poly-n-propyl methacrylate | 42 | ++ | ++ |
| Poly-n-butyl methacrylate | 38 | +(UCST) | +(UCST) |
| Polyisobutyl methacrylate | 36 | ++ | ++ |
| Poly-n-hexyl methacrylate | 8 | — | ++ |
| Polyneopentyl methacrylate | 8 | — | +(LCST) |
| Polyisobornyl methacrylate | 2 | +— | +— |
| Poly-3,3,5-trimethyl-cyclohexyl methacrylate | 6 | — | +— |
| Polybenzyl methacrylate | 18 | — | — |

"—" = incompatible in all mixture ratios.
"++" = Compatible in all mixture ratios, over the entire temperature range studied (20-260° C.).
"+—" = At 20° C., 1:1 mixture incompatible, but 5:95 and 95:5 mixtures compatible.
+(LCST) = Compatible in all mixture ratios at 20° C., but de-mixing occurs on heating (see FIG. 1).
+(UCST) = Compatible in all mixture ratios at elevated temperature (200° C.), but 1:1 mixture incompatible at room temperature.
[1] Continuously produced styrene-butyl acrylate copolymer with 40 wt. % styrene in the copolymer. J = 57 ml/g.
[2] 25 wt. % styrene in the copolymer. J = 54 ml/g.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A compatible, single phase, polymer mixture of two polymers, said polymer mixture displaying a single glass transition temperature, said polymer mixture consisting essentially of A) 1-99 wt. % of a copolymer having formula I

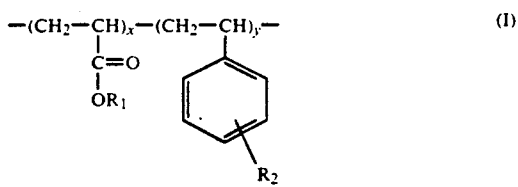

and

B) 99-1 st. % of a polyalkyl methacrylate prepared from at least one monomer having the formula II

wherein $R_1$ is a $C_{1-4}$ aliphatic hydrocarbon group, $R_2$ is hydrogen or methyl, $R_3$ is a $C_{2-8}$ non-cyclic aliphatic hydrocarbon group, x is 10-90 wt. % based on the amount of copolymer I and y is 90-20 wt. % based on the amount of copolymer I.

2. The polymer mixture of claim 1, consisting essentially of 5-wt. % copolymer I and 95-5 wt. % polyalkyl methacrylate.

3. The polymer mixture of claim 1, consisting essentially of 25-75 wt. % copolymer I and 75-25 wt. % polyalkyl methacrylate.

4. The polymer mixture of claim 1, wherein $R_1$ is a $C_{2-4}$ aliphatic hydrocarbon group.

5. The polymer mixture of claim 1, wherein $R_2$ is hydrogen.

6. The polymer mixture of claim 1, wherein said polyalkyl methacrylate comprises greater than 80 wt. % units derived from monomers having formula II.

7. The polymer mixture of claim 1, wherein copolymer I is a copolymer of n-butylacrylate and styrene.

8. The polymer mixture of claim 7, wherein the ratio of n-butylacrylate/styrene is in the range 40:60 to 80:20.

9. The polymer mixture of claim 7, wherein $R_3$ is isobutyl.

10. The polymer mixture of claim 7, wherein $R_3$ is n-propyl.

11. The polymer mixture of claim 7, wherein $R_3$ is n-hexyl.

12. The polymer mixture of claim 7, wherein $R_3$ is ethyl.

13. The polymer mixture of claim 7, wherein $R_3$ is n-butyl.

14. The polymer mixture of claim 1, wherein copolymer I comprises a copolymer of ethylacrylate and styrene.

15. The polymer mixture of claim 14, wherein the ratio of ethylacrylate/styrene is in the range 70:30 to 20:80.

16. The polymer mixture of claim 14, wherein $R_3$ is ethyl.

17. The polymer mixture of claim 1, wherein said copolymer I comprises a copolymer of methylacrylate and styrene.

18. The polymer mixture of claim 17, wherein the ratio of methylacrylate/styrene is in the range 50:50 to 20:80.

19. The polymer mixture of claim 17, wherein $R_3$ is ethyl.

20. A polymer mixture, comprising:

40-99 wt. % of a compatible, single phase, polymer mixture of two polymers, said polymer mixture displaying a single glass transition temperature, said polymer mixture consisting essentially of A) 1-99 wt. % of a copolymer having formula I

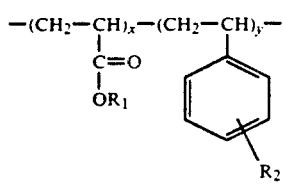

and

B) 99-1 wt. % of a polyalkyl methacrylate prepared from at least one monomer having formula II

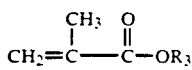

wherein $R_1$ is a $C_{1-4}$ aliphatic hydrocarbon group, $R_2$ is a hydrogen or methyl, $R_3$ is a $C_{2-8}$ non-cyclic aliphatic hydrocarbon group, x is 10-90 wt. % based on the amount of copolymer I and y is 90-20 wt. % based on the amount of copolymer I; and 60-1 wt. % of a third polymer, wherein said third polymer is incompatible with said copolymer having formula I, said polyalkyl methacrylate and said compatible, single phase, polymer mixture.

21. The polymer mixture of claim 20, comprising 70-95 wt. % of said compatible, single phase, polymer mixture and 30-5 wt. % of said third polymer.

22. The polymer composition of claim 20, wherein $$|n_D{}^{25}{}_{PM} - n_D{}^{25}{}_P| < 0.01$$

where $n_D{}^{25}{}_{PM}$ is the refractive index of the compatible, single phase, polymer mixture and $n_D{}^{25}{}_P$ refractive index of the third polymer.

23. The polymer mixture of claim 20, wherein said third polymer is polybutadiene or polyisoprene.

* * * * *